United States Patent
Mizuno

(10) Patent No.: US 8,625,913 B2
(45) Date of Patent: Jan. 7, 2014

(54) IMAGE PROCESSING APPARATUS AND IMAGE PROCESSING METHOD

(75) Inventor: Ryosuke Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/352,171

(22) Filed: Jan. 17, 2012

(65) Prior Publication Data

US 2012/0207399 A1      Aug. 16, 2012

(30) Foreign Application Priority Data

Feb. 10, 2011    (JP) ................... 2011-027845

(51) Int. Cl.
G06K 9/36    (2006.01)
G06K 9/40    (2006.01)
G06K 9/46    (2006.01)
H04N 11/20   (2006.01)

(52) U.S. Cl.
USPC ............ 382/233; 382/260; 348/441

(58) Field of Classification Search
USPC ........ 382/232–233, 244, 260; 348/441, 448, 348/598
See application file for complete search history.

(56) References Cited

U.S. PATENT DOCUMENTS

| | | | |
|---|---|---|---|
| 2009/0040374 A1 | 2/2009 | Kobayashi | 348/448 |
| 2009/0073192 A1* | 3/2009 | Kobayashi | 345/643 |
| 2009/0310018 A1* | 12/2009 | Sakashita et al. | 348/448 |
| 2010/0020230 A1* | 1/2010 | Suzuki | 348/441 |
| 2010/0098349 A1* | 4/2010 | Arashima et al. | 382/263 |
| 2011/0170009 A1* | 7/2011 | Uemura et al. | 348/598 |
| 2011/0267424 A1* | 11/2011 | Koike | 348/43 |

FOREIGN PATENT DOCUMENTS

JP     2009-044460     2/2009

* cited by examiner

*Primary Examiner* — Li Liu
(74) *Attorney, Agent, or Firm* — Fitzpatrick, Cella, Harper & Scinto

(57) ABSTRACT

A low frequency component image L[i] and high frequency component-emphasized image SH[i] are generated from an image A[i]. Lossy compression processing is performed for the low frequency component image L[i] to generate a compressed image C[i] and store it in a memory. A compressed image C[i−1] is decoded to generate a decoded image L'[i−1]. The compressed image C[i] is decoded to generate a decoded image L'[i]. A difference image E[i] between the decoded image L'[i] and the low frequency component image L[i] is generated. The low frequency component image L[i], decoded image L'[i−1], and difference image E[i] are composited at a predetermined ratio to generate a composite image SL[i]. The high frequency component-emphasized image SH[i] and composite image SL[i] are output as subframe images of the i-th frame.

7 Claims, 6 Drawing Sheets

FIG. 2

| SUBFRAME NUMBER | 1 | 2 | 3 | 4 | 5 | 6 |
|---|---|---|---|---|---|---|
| INPUT IMAGE | $A[i-1]$ | $A[i-1]$ | $A[i]$ | $A[i]$ | $A[i+1]$ | $A[i+1]$ |
| OUTPUT IMAGE | $SL[i-1]$ | $SH[i-1]$ | $SL[i]$ | $SH[i]$ | $SL[i+1]$ | $SH[i+1]$ |
| CONTENTS OF OUTPUT IMAGE | $L'[i-2]\times\alpha$ $+L[i-1]\times(1-\alpha)$ $+E[i-1]\times\beta$ | $2\times A[i-1]$ $-L[i-1]$ | $L'[i-1]\times\alpha$ $+L[i]\times(1-\alpha)$ $+E[i]\times\beta$ | $2\times A[i]-L[i]$ | $L'[i]\times\alpha$ $+L[i+1]\times(1-\alpha)$ $+E[i+1]\times\beta$ | $2\times A[i+1]$ $-L[i+1]$ |

IMAGE PROCESSING APPARATUS AND IMAGE PROCESSING METHOD

BACKGROUND OF THE INVENTION

1. Field of the Invention

The present invention relates to a technique for image display.

2. Description of the Related Art

Recently, image display apparatuses with various display units such as a liquid crystal display panel have been put into practical use, including a TV receiver and PC monitor. However, when pursuit for a moving object (way of viewing in which a moving object is pursued by the line of sight on the movie display) is performed on a hold type display apparatus typified by a liquid crystal display apparatus, a motion blur corresponding to the optical output period is observed.

As a technique for reducing such a motion blur, a "spatial frequency division method" has been proposed. The "spatial frequency division method" is a method of doubling the 60-Hz frame rate of an input image signal to 120 Hz, gathering spatial high frequency components of an image regarding a motion blur to one subframe to decrease those of the other subframe, and then displaying the image. In the output image, spatial high frequency components are localized in one subframe, suppressing the motion blur.

In Japanese Patent Laid-Open No. 2009-044460, the frame rate of input image data is doubled. Then, the input image data is divided into spatial high frequency component-emphasized image data and low frequency component image data, and these image data are switched and displayed for respective subframes. At this time, low frequency component image data is formed from the average value of low frequency component image data respectively generated from immediately preceding and succeeding subframes which sandwich the subframe of the low frequency component image data. The use of the average value can reduce a temporal shift of the barycenter on the display of high frequency component-emphasized image data and low frequency component image data. In Japanese Patent Laid-Open No. 2009-044460, a motion blur can be suppressed, and a ghost and tailing blur visually perceived due to a temporal shift of the barycenter can be reduced further.

In Japanese Patent Laid-Open No. 2009-044460, low frequency component image data to be displayed is formed from the average value of low frequency component image data that is respectively generated from immediately preceding and succeeding subframes that sandwich the subframe of the low frequency component image data, as described above. Obtaining the average value of low frequency component image data requires low frequency component image data generated from input image data of at least one immediately preceding subframe. A memory is therefore needed to store low frequency component image data.

When low frequency component image data is lossily compressed to compress the memory band, the compression and decoding generate a compression error, degrading the image quality. In the "spatial frequency division method", the compression error amount changes depending on the spatial frequency characteristic. For example, even input image data having the same tone value may be visually perceived to have different tone values within the region due to the difference of the frequency characteristic.

SUMMARY OF THE INVENTION

The present invention has been made to solve the above problems, and provides a technique for suppressing degradation of the image quality caused when a low frequency component image is lossily compressed.

According to one aspect of the present invention, there is provided an image processing apparatus comprising: a unit that generates, from an input image of an i-th (i=1, 2, ... ) frame, an image of a low frequency component in the image of the i-th frame as a low frequency component image i; a unit that generates, from the image of the i-th frame, a high frequency component-emphasized image i which emphasizes a high frequency component in the image of the i-th frame; a unit that performs lossy compression processing for the low frequency component image i to generate a compressed image i and store the generated compressed image i in a memory; a unit that decodes a compressed image (i−1) stored in the memory to generate a decoded image (i−1); a unit that decodes the compressed image i to generate a decoded image i; a unit that generates a difference image between the decoded image i and the low frequency component image i; a generation unit that composites the low frequency component image i, the decoded image (i−1), and the difference image at a predetermined ratio to generate a composite image; and an output unit that outputs the high frequency component-emphasized image i and the composite image as subframe images of the i-th frame.

According to another aspect of the present invention, there is provided an image processing apparatus comprising: a unit that generates, from an input image of an i-th (i=1, 2, ... ) frame, an image of a low frequency component in the image of the i-th frame as a low frequency component image i; a unit that generates, from the image of the i-th frame, a high frequency component-emphasized image i which emphasizes a high frequency component in the image of the i-th frame; a unit that performs lossy compression processing for the low frequency component image i to generate a compressed image i and store the generated compressed image i in a memory; a unit that decodes a compressed image (i−1) stored in the memory to generate a decoded image (i−1); a unit that decodes the compressed image i to generate a decoded image i; a unit that generates a difference image between the decoded image i and the low frequency component image i; a unit that generates an image E1 having a pixel value obtained by multiplying a pixel value of each pixel forming the difference image by r (0<r<1), and an image E2 having a pixel value obtained by multiplying a pixel value of each pixel forming the difference image by (1−r); a unit that composites the low frequency component image i, the decoded image (i−1), and the image E1 at a predetermined ratio to generate a composite image; and a unit that outputs an image obtained by compositing the high frequency component-emphasized image i and the image E2, and the composite image as subframe images of the i-th frame.

According to still another aspect of the present invention, there is provided an image processing method to be performed by an image processing apparatus, comprising: a step of generating, from an input image of an i-th (i=1, 2, ... ) frame, an image of a low frequency component in the image of the i-th frame as a low frequency component image i; a step of generating, from the image of the i-th frame, a high frequency component-emphasized image i which emphasizes a high frequency component in the image of the i-th frame; a step of performing lossy compression processing for the low frequency component image i to generate a compressed image i and store the generated compressed image i in a memory; a step of decoding a compressed image (i−1) stored in the memory to generate a decoded image (i−1); a step of decoding the compressed image i to generate a decoded image i; a step of generating a difference image between the decoded image i and the low frequency component image i; a generation step of compositing the low frequency component image i, the decoded image (i−1), and the difference image at a predetermined ratio to generate a composite image; and an output step of outputting the high frequency component-emphasized image i and the composite image as subframe images of the i-th frame.

According to yet still another aspect of the present invention, there is provided an image processing method to be performed by an image processing apparatus, comprising the steps of: generating, from an input image of an i-th (i=1, 2, . . . ) frame, an image of a low frequency component in the image of the i-th frame as a low frequency component image i; generating, from the image of the i-th frame, a high frequency component-emphasized image i which emphasizes a high frequency component in the image of the i-th frame; performing lossy compression processing for the low frequency component image i to generate a compressed image i and store the generated compressed image i in a memory; decoding a compressed image (i−1) stored in the memory to generate a decoded image (i−1); decoding the compressed image i to generate a decoded image i; generating a difference image between the decoded image i and the low frequency component image i; generating an image E1 having a pixel value obtained by multiplying a pixel value of each pixel forming the difference image by r (0<r<1), and an image E2 having a pixel value obtained by multiplying a pixel value of each pixel forming the difference image by (1−r); compositing the low frequency component image i, the decoded image (i−1), and the image E1 at a predetermined ratio to generate a composite image; and outputting an image obtained by compositing the high frequency component-emphasized image i and the image E2, and the composite image as subframe images of the i-th frame.

Further features of the present invention will become apparent from the following description of exemplary embodiments with reference to the attached drawings.

BRIEF DESCRIPTION OF THE DRAWINGS

FIG. 2 is a table showing the time series relationship between an input frame image and an output subframe image;

DESCRIPTION OF THE EMBODIMENTS

Embodiments of the present invention will now be described with reference to the accompanying drawings. Note that the following embodiments are merely examples of concretely practicing the present invention, and are detailed examples of arrangements defined in the scope of appended claims.

First Embodiment

An image processing apparatus according to the first embodiment obtains an output frame rate double the input frame rate by decomposing the image of each input frame into two subframe images and outputting the two subframe images within the one-frame period. At this time, the "spatial frequency division method" suppresses a motion blur, and also reduces a ghost and tailing blur visually perceived due to a temporal shift of the barycenter on the display.

Figure 1:
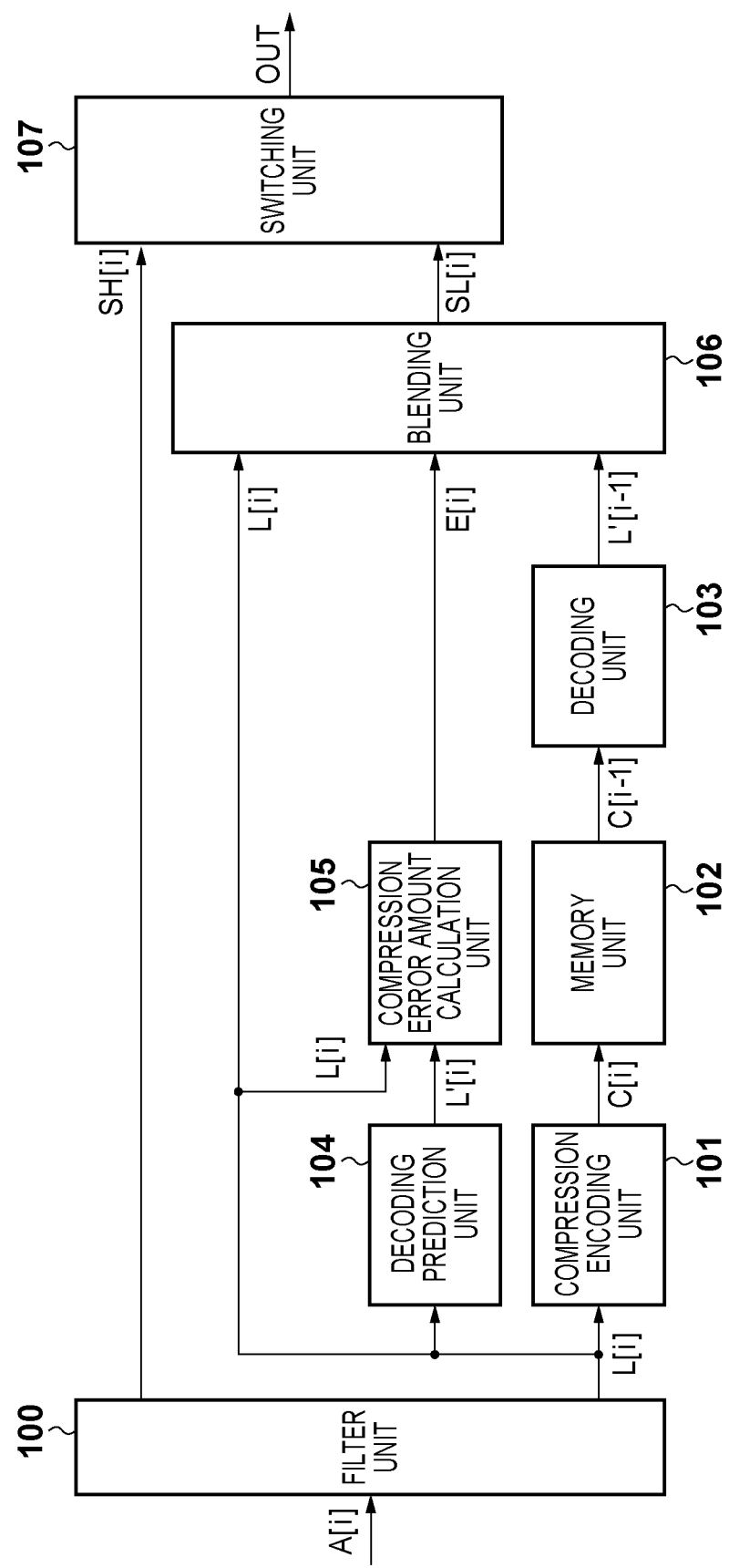
FIG. 1 is a block diagram exemplifying the functional arrangement of an image processing apparatus.

First, an image processing apparatus according to the first embodiment will be explained with reference to the block diagram of FIG. 1. An image of the i-th (i=1, 2, . . . ) frame (i-th image input to the image processing apparatus) will be referred to as A[i].

Upon receiving the image A[i], a filter unit 100 generates, from the image A[i], an image of a low frequency component in the image A[i] (in the image) as a low frequency component image i, and a high frequency component-emphasized image i which emphasizes a high frequency component in the image A[i]. The low frequency component image i generated from the image A[i] will be referred to as L[i], and the high frequency component-emphasized image i generated from the image A[i] will be referred to as SH[i].

The low frequency component image is generated by, for example, performing low-pass filter processing for the image A[i]. The generation method is not particularly limited. The high frequency component-emphasized image is generated according to, for example, the following equation:

$$SH[i] = 2 \times A[i] - L[i]$$

The filter unit 100 sends the generated high frequency component-emphasized image SH[i] to a switching unit 107, and the low frequency component image L[i] to a decoding prediction unit 104, blending unit 106, compression error amount calculation unit 105, and compression encoding unit 101.

The compression encoding unit 101 performs lossless compression processing for the low frequency component image L[i], generating a compressed image i. The compressed image i will be referred to as C[i]. The compression encoding unit 101 stores the generated compressed image C[i] in a memory unit 102.

A decoding unit 103 reads out a compressed image C[i−1] from the memory unit 102 and decodes it, generating a decoded image (i−1). The decoded image i will be referred to as L'[i]. The decoding unit 103 sends the generated decoded image L'[i−1] to the blending unit 106.

The decoding prediction unit 104 performs lossless compression processing for the low frequency component image L[i], generating the compressed image C[i]. Further, the decoding prediction unit 104 decodes the generated compressed image C[i], generating the decoded image L'[i]. The lossless compression processing and decoding processing are almost the same as those performed by the compression encoding unit 101 and decoding unit 103, respectively. The decoding prediction unit 104 sends the generated decoded image L'[i] to the compression error amount calculation unit 105.

The compression error amount calculation unit 105 generates a difference image (compression error amount) E[i] between the low frequency component image L[i] sent from the filter unit 100 and the decoded image L'[i] sent from the decoding prediction unit 104 in accordance with the following equation:

$$E[i] = L[i] - L'[i]$$

When no compression is executed, L'[i]=L[i] and E[i]=0. The compression error amount calculation unit 105 sends the generated difference image E[i] to the blending unit 106.

The blending unit 106 composites the low frequency component image L[i], decoded image L'[i−1], and difference image E[i] at a predetermined ratio, generating a composite image SL[i]. For example, the composite image SL[i] is generated according to the following equation using α (0≤α≤1) and β (0≤β≤1):

$$SL[i]=L'[i-1]\times\alpha+L[i]\times(1-\alpha)+E[i]\times\beta$$

That is, the blending unit 106 composites an image obtained by multiplying the pixel value of each pixel forming the decoded image L'[i−1] by α, an image obtained by multiplying the pixel value of each pixel forming the low frequency component image L[i] by (1−α), and an image obtained by multiplying the pixel value of each pixel forming the difference image E[i] by β. The blending unit 106 sends the generated composite image SL[i] to the switching unit 107.

The switching unit 107 alternately switches and outputs, as subframe images of the i-th frame, the high frequency component-emphasized image SH[i] sent from the filter unit 100 and the composite image SL[i] sent from the blending unit 106. For example, the switching unit 107 outputs the composite image SL[i] first and then the high frequency component-emphasized image SH[i]. As subframe images of the i-th frame, the composite image SL[i] and high frequency component-emphasized image SH[i] can be output in the order named. The output destination is a display apparatus such as a CRT or liquid crystal screen, but is not particularly limited.

Hence, the "spatial frequency division method" can suppress a motion blur, and reduce a ghost and tailing blur visually perceived due to a temporal shift of the barycenter on the display.

Next, the time series relationship between an input frame image and an output subframe image will be explained with reference to FIG. 2. The "subframe number" on the first line is a number assigned to each output subframe image, and the number is 1, 2, ... in the output order.

The second line from the top indicates an input frame image. The third line from the top indicates an output subframe image. The fourth line from the top indicates details of the output subframe image.

For example, when the image A[i−1] of the (i−1)th frame is input, a subframe image SL[i−1] having the subframe number=1 is output, as represented by the third line from the top. As represented by the fourth line from the top, SL[i−1] is "L'[i−2]×α+L[i−1]×(1−α)+E[i−1]×β". After outputting SL[i−1], a subframe image SH[i−1] having the subframe number=2 is output, as represented by the third line from the top. As represented by the fourth line from the top, SH[i−1] is "2×A[i−1]−L[i−1]". In this manner, subframe images are output sequentially.

L[i] generated from A[i] is ideally distributed to output images in accordance with the coefficient α for the subframe number=3 and 5 in the table shown in FIG. 2. However, when the memory band is compressed, a compression error is generated for the subframe number=5. The compression error amount can be expressed as E[i]×β. If the coefficient β has the same value as that of the coefficient α, E[i]×β has been composited in advance for the subframe number=3.

That is, in the embodiment, the compression error amount is composited to an image of the second preceding subframe and output. An output tone value integrated in the unit time can be adjusted to be almost equal to an ideal value obtained when no memory band is compressed. Especially in a still image, compression error amounts generated in respective frames are equal. Thus, the compression error amount E[i]×β for the subframe number=3 and the compression error amount E[i+1]×β composited for the subframe number=5 become equal. That is, the contents of the output image become equal to an ideal output of L[i]×α+L[i+1]×(1−α).

The coefficient β has the same value as that of the coefficient α. The coefficient β determines the degree at which the compression error amount is composited to an image of the second preceding subframe. The coefficient β is desirably set to satisfy β≤α.

According to the first embodiment, the compression error amount upon compression of the memory band is calculated in advance and composited to an image. An output tone value integrated in the unit time can be adjusted to be almost equal to an ideal value obtained when no memory band is compressed. Particularly when the input image is a still image, the output tone value can be set equal to the ideal value. This can suppress degradation of the image quality caused when a low frequency component image is lossily compressed. At this time, no compression error amount need be held for frame delay, so a memory for storing the compression error amount is not required.

Note that lossy compression processing in the compression encoding unit 101 is arbitrary. For example, a compression encoding method based on a decoding result prediction value, like DPCM (Differential Pulse Code Modulation), does not require the decoding prediction unit 104, and a prediction value used in compression is employed as L'[i].

Second Embodiment

In the first embodiment, the compression error amount E[i] is composited to an image of the second preceding subframe consequently. Particularly when the input image is a still image, the output tone value can be made equal to the ideal value. However, the input image is displayed upon compositing the compression error amount to the second subframe preceding a subframe which actually generates an error. When the input image is a movie, a ghost or stain may be visually perceived near the moving object owing to a temporal shift of the display.

In the second embodiment, the compression error amount E[i] is distributed and composited to an image of an immediately preceding subframe and an image of the second preceding subframe. Hence, the compression error amount can be composited to a display image temporally closest to a subframe which actually generates an error.

Figure 3:
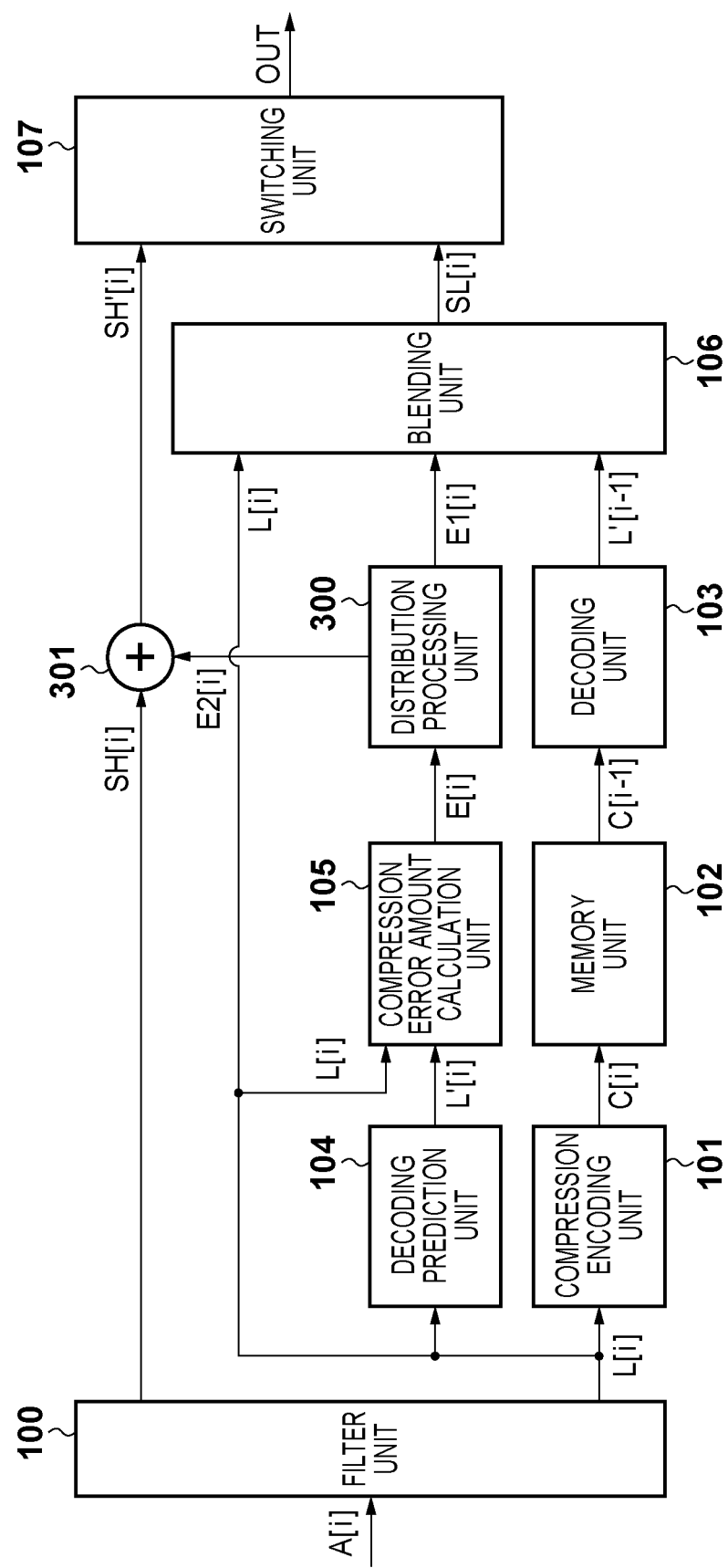
FIG. 3 is a block diagram exemplifying the functional arrangement of an image processing apparatus.

The functional arrangement of an image processing apparatus according to the second embodiment will be exemplified with reference to the block diagram of FIG. 3. In FIG. 3, the same reference numerals as those in FIG. 1 denote the same building elements, and a description thereof will not be repeated.

A distribution processing unit 300 divides E[i] calculated by a compression error amount calculation unit 105 into E1[$i$] and E2[$i$] (E[i]=E1[$i$]+E2[$i$]). For example, the distribution processing unit 300 generates an image E1[$i$] having a pixel value obtained by multiplying the pixel value of each pixel forming the image E[i] by r (0<r<1), and an image E2[$i$] having a pixel value obtained by multiplying the pixel value of each pixel forming the image E[i] by (1−r). The distribution processing unit 300 sends E1[$i$] to a blending unit 106 and E2[$i$] to an adder 301.

The adder 301 generates, as SH'[i], an image obtained by compositing E2[$i$] to SH[i] from a filter unit 100. The adder 301 sends the generated image SH'[i] to the blending unit 106.

The blending unit 106 composites the low frequency component image L[i], decoded image L'[i−1], and difference image E1[$i$] at a predetermined ratio, generating a composite image SL[i]. For example, the composite image SL[i] is generated according to the following equation using α (0≤α≤1) and β (0≤β≤1):

$$SL[i]=L'[i-1]×α+L[i]×(1-α)+E1[i]×β$$

The blending unit 106 sends the generated composite image SL[i] to a switching unit 107. The switching unit 107 alternately switches and outputs, as subframe images of the i-th frame, the image SH'[i] sent from the adder 301 and the composite image SL[i] sent from the blending unit 106. For example, the switching unit 107 outputs the composite image SL[i] first and then the image SH'[i]. The output destination is a display apparatus such as a CRT or liquid crystal screen, but is not particularly limited.

According to the second embodiment, the compression error amount E[i] is distributed and composited to an image of an immediately preceding subframe and an image of the second preceding subframe. The compression error amount can be composited to a display image temporally closest to a subframe which actually generates a compression error. This can reduce a ghost or stain near a moving object that is visually perceived owing to a temporal shift of the display of the compression error amount.

Third Embodiment

In the first and second embodiments, the blending unit 106 and adder 301 execute image composition. However, the composite image may deviate from the displayable data value allowable range depending on the magnitude and coefficient of the compression error amount. The third embodiment can suppress degradation of the image quality even when the composite image deviates from the displayable data value allowable range.

Figure 4:
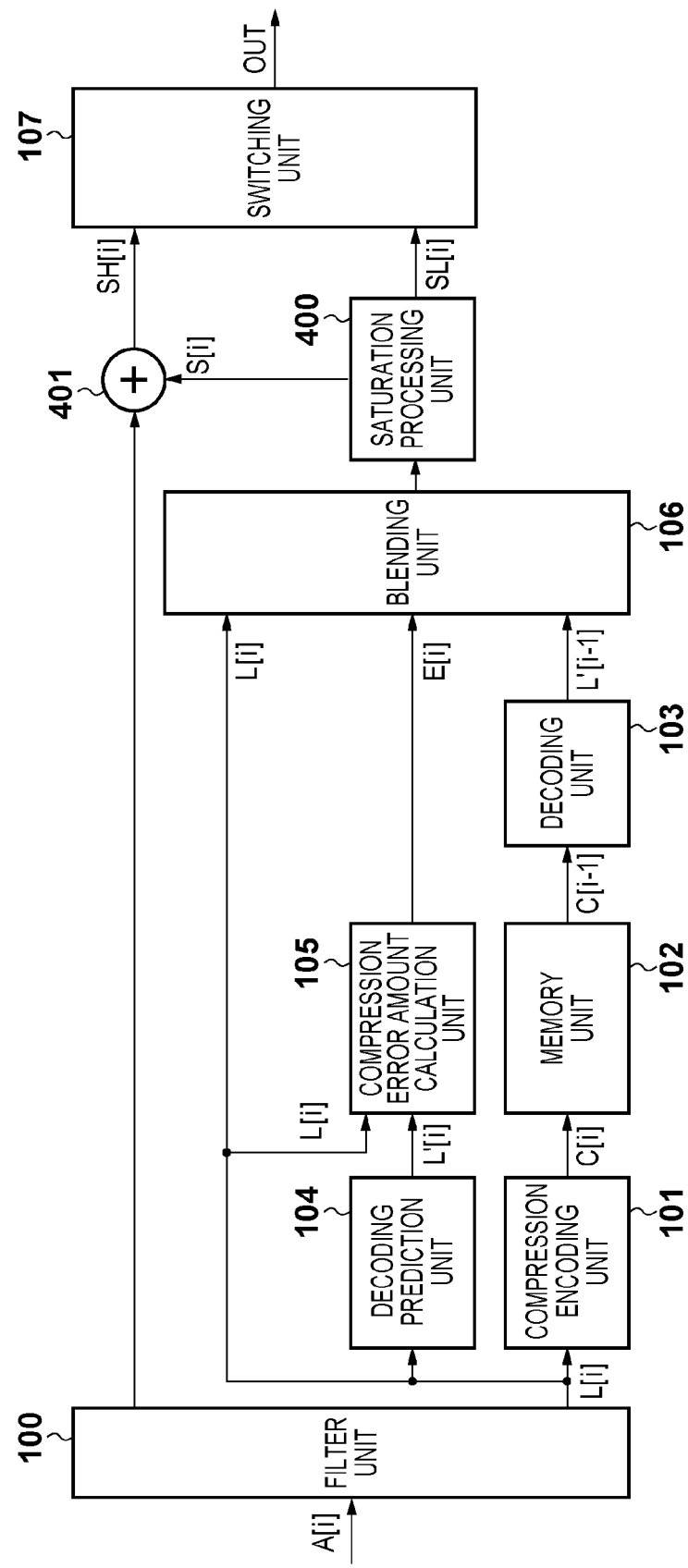
FIG. 4 is a block diagram exemplifying the functional arrangement of an image processing apparatus.

The arrangement of an image processing apparatus according to the third embodiment will be described with reference to the block diagram of FIG. 4. In FIG. 4, the same reference numerals as those in FIG. 1 denote the same building elements, and a description thereof will not be repeated.

A composite image SL[i] may deviate from the displayable data value allowable range depending on the compression error amount E[i] to be composited by a blending unit 106 or the coefficient β. When the composite image SL[i] deviates from the data value allowable range, a saturation processing unit 400 corrects the composite image SL[i] to fall within the allowable range, and outputs the corrected composite image SL[i] to a switching unit 107. Also, the saturation processing unit 400 outputs, to a saturation composition unit 401, a correction amount S[i] which has been added to or subtracted from the input in the saturation processing. The saturation composition unit 401 composites part or all of the correction amount S[i] to the high frequency component-emphasized image SH[i] based on a predetermined coefficient, and outputs the resultant high frequency component-emphasized image SH[i] to the switching unit 107.

Figure 5:
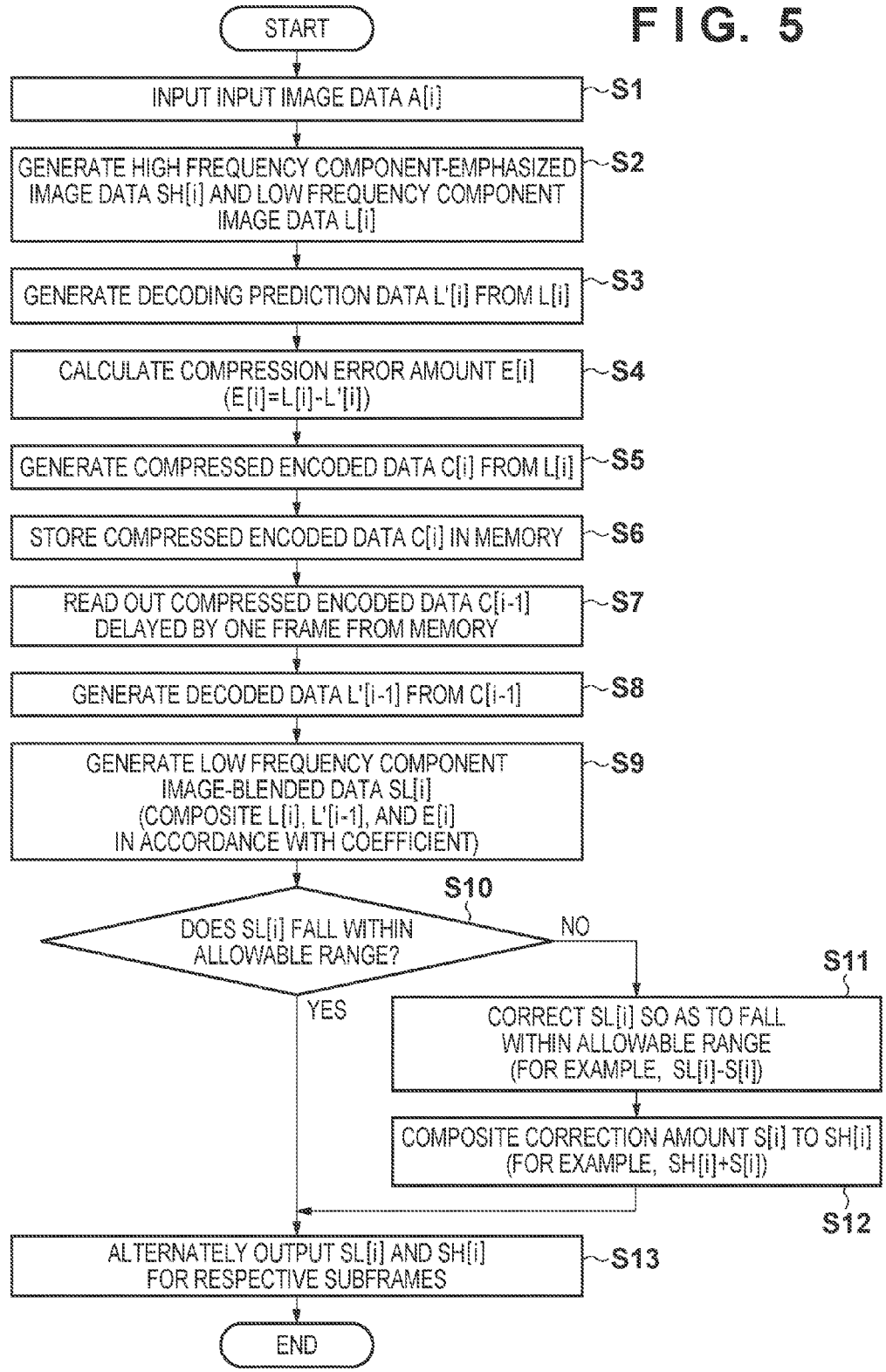
FIG. 5 is a flowchart showing processing to be performed by the image processing apparatus.

Processing to be performed by the image processing apparatus according to the third embodiment will be explained with reference to FIG. 5 which is a flowchart showing this processing. In step S1, a filter unit 100 acquires an image A[i]. In step S2, the filter unit 100 generates a low frequency component image L[i] and high frequency component-emphasized image SH[i] from the image A[i].

In step S3, a decoding prediction unit 104 performs lossless compression processing for the low frequency component image L[i], generating a compressed image C[i]. Further, the decoding prediction unit 104 decodes the generated compressed image C[i], generating a decoded image L'[i].

In step S4, a compression error amount calculation unit 105 calculates E[i]=L[i]−L'[i], generating a difference image (compression error amount) E[i] between the low frequency component image L[i] sent from the filter unit 100 and the decoded image L'[i] sent from the decoding prediction unit 104.

In step S5, a compression encoding unit 101 performs lossless compression processing for the low frequency component image L[i], generating a compressed image C[i]. In step S6, the compression encoding unit 101 stores the generated compressed image C[i] in a memory unit 102.

In step S7, a decoding unit 103 reads out a compressed image C[i−1] from the memory unit 102. In step S8, the decoding unit 103 decodes the compressed image C[i−1], generating a decoded image L'[i−1].

In step S9, the blending unit 106 composites the low frequency component image L[i], decoded image L'[i−1], and difference image E[i] at a predetermined ratio in the same way as in the first embodiment, generating a composite image SL[i].

In step S10, the saturation processing unit 400 determines whether the pixel value of each pixel forming the composite image SL[i] falls within the allowable range. For example, the saturation processing unit 400 determines whether the pixel value falls within the range of pixel values displayable by a display apparatus. If the saturation processing unit 400 determines that the pixel value falls within the allowable range, the process advances to step S13; if NO, to step S11.

In step S11, the saturation processing unit 400 corrects the composite image SL[i] so that the pixel value of each pixel forming the composite image SL[i] falls within the allowable range. For example, the saturation processing unit 400 updates the composite image SL[i] by subtracting a predetermined correction amount S[i] from the pixel value of each pixel forming the composite image SL[i].

In step S12, the saturation composition unit 401 updates the high frequency component-emphasized image SH[i] by adding the predetermined correction amount S[i] to the pixel value of each pixel forming the high frequency component-emphasized image SH[i]. Instead of the predetermined correction amount S[i], d (0<d<1)×S[i] may be added.

In step S13, the switching unit 107 alternately switches and outputs, as subframe images of the i-th frame, the high frequency component-emphasized image SH[i] and composite image SL[i].

The third embodiment is also applicable to the second embodiment. More specifically, when the high frequency component-emphasized image SH'[i] obtained by the adder 301 deviates from the displayable data value allowable range, the above-described saturation processing is performed even for an output from the adder 301 in the same way. The third embodiment can obtain the same effects as those of the above-described embodiments, and can suppress degradation of the image quality caused by saturation of display data.

Fourth Embodiment

Figure 6:
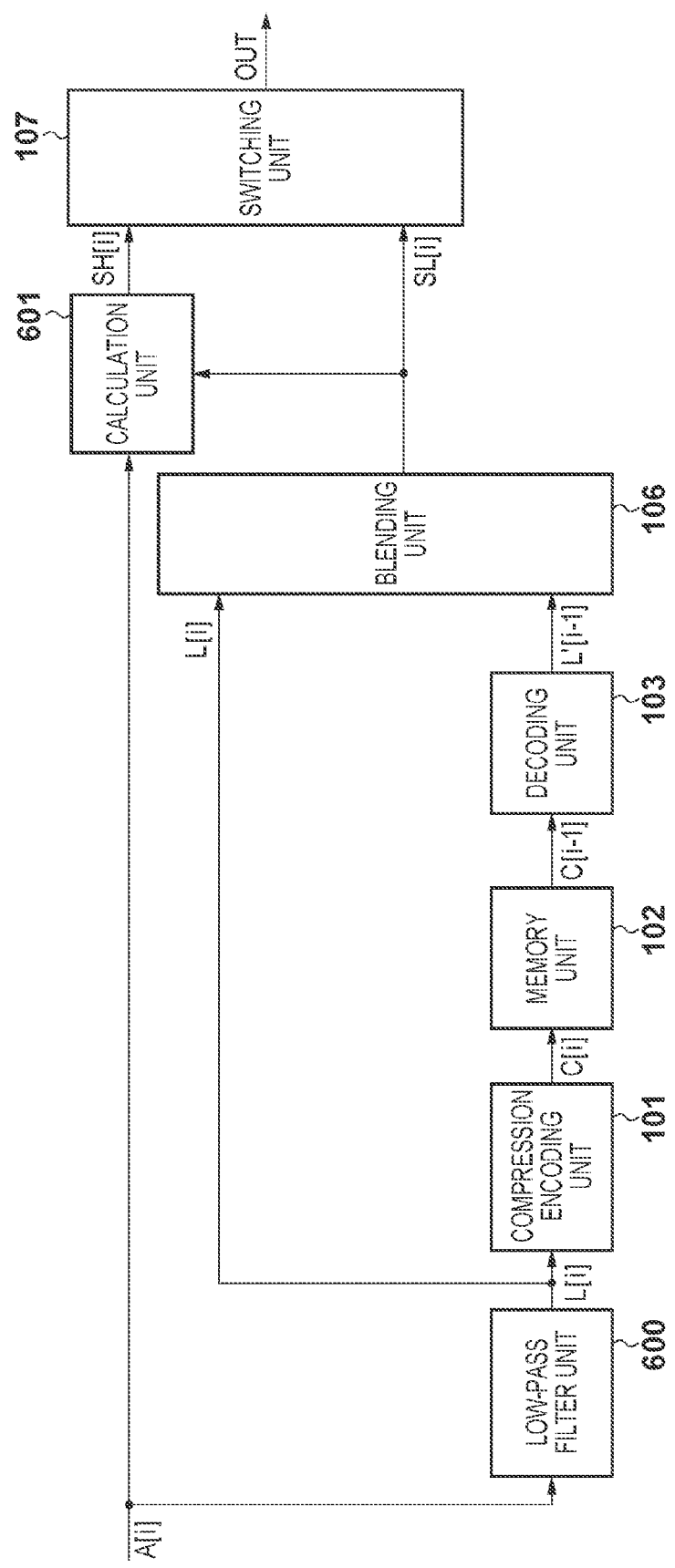
FIG. 6 is a block diagram exemplifying the functional arrangement of an image processing apparatus.

The functional arrangement of an image processing apparatus according to the fourth embodiment will be described with reference to the block diagram of FIG. 6. In FIG. 6, the same reference numerals as those in FIG. 1 denote the same building elements, and a description thereof will not be repeated.

Upon receiving an image A[i], a low-pass filter unit 600 performs low-pass filter processing for the image A[i] by, for example, cutting off (filtering) a lower limit spatial frequency given by a predetermined constant from the image A[i], thereby generating a low frequency component image L[i].

A blending unit 106 composites the low frequency component image L[i] and an image L'[i−1] decoded by a decoding unit 103 at a predetermined ratio, generating a composite image SL[i]. For example, the blending unit 106 calculates SL[i]=L[i]×(1−α)+L'[i−1]×α.

A calculation unit 601 calculates SH[i]=2×A[i]−SL[i], generating a high frequency component-emphasized image SH[i]. Needless to say, processing for obtaining the high frequency component-emphasized image SH[i] is not limited to this.

A switching unit 107 alternately switches and outputs, as subframe images of the i-th frame, the high frequency component-emphasized image SH[i] and composite image SL[i]. For example, the switching unit 107 outputs the composite image SL[i] first and then the high frequency component-emphasized image SH[i]. As subframe images of the i-th frame, the composite image SL[i] and high frequency component-emphasized image SH[i] can be output in the order named. The output destination is a display apparatus such as a CRT or liquid crystal screen, but is not particularly limited.

According to the fourth embodiment, the high frequency component-emphasized image SH[i] is generated based on the composite image SL[i] containing the compression error amount. Although the fourth embodiment is different from the above-described embodiments in the method of generating the high frequency component-emphasized image SH[i], a compression error amount-composited output result can be obtained. That is, an output tone value integrated in the unit time can be adjusted to be almost equal to an ideal value, suppressing degradation of the image quality caused when the low frequency component image L[i] is lossily compressed.

In the above description, the input image is an image input upon dividing one frame into two subframes to double the frame rate. However, the input image is arbitrary. As described above, the present invention can suppress degradation of the image quality caused when low frequency component image data is lossily compressed.

Fifth Embodiment

Although the respective units shown in FIGS. 1, 3, 4, and 6 may be formed from hardware, the units except for the memory unit 102 may be formed from software (computer program). In this case, the software is installed in a PC (Personal Computer) including the memory unit 102, and a control unit such as a CPU in the PC executes the software. The PC implements the functions of the respective units shown in FIGS. 1, 3, 4, and 6.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-027845 filed Feb. 10, 2011, which is hereby incorporated by reference herein in its entirety.

What is claimed is:

1. An image processing apparatus comprising:
a unit that generates, from an input image of an i-th (i=1, 2, ...) frame, an image of a low frequency component in the image of the i-th frame as a low frequency component image i;
a unit that generates, from the image of the i-th frame, a high frequency component-emphasized image i which emphasizes a high frequency component in the image of the i-th frame;
a unit that performs lossy compression processing for the low frequency component image i to generate a compressed image i and store the generated compressed image i in a memory;
a unit that decodes a compressed image (i−1) stored in the memory to generate a decoded image (i−1);
a unit that decodes the compressed image i to generate a decoded image i;
a unit that generates a difference image between the decoded image i and the low frequency component image i;
a generation unit that composites the low frequency component image i, the decoded image (i−1), and the difference image at a predetermined ratio to generate a composite image; and
an output unit that outputs the high frequency component-emphasized image i and the composite image as subframe images of the i-th frame.

2. The apparatus according to claim 1, further comprising an updating unit that, when a pixel value of each pixel forming the composite image falls outside a predetermined allowable range, corrects the pixel value so as to fall within the predetermined allowable range, and adds an amount of the correction to a pixel value of each pixel forming the high frequency component-emphasized image i,
wherein said output unit outputs, as subframe images of the i-th frame, the high frequency component-emphasized image i and the composite image each of which is updated by said updating unit.

3. The apparatus according to claim 1, wherein said generation unit generates the composite image by compositing an image obtained by multiplying a pixel value of each pixel forming the decoded image (i−1) by α (0≤α≤1), an image obtained by multiplying a pixel value of each pixel forming the low frequency component image i by (1−α), and an image obtained by multiplying a pixel value of each pixel forming the difference image by β (0≤β≤1).

4. An image processing apparatus comprising:
a unit that generates, from an input image of an i-th (i=1, 2, ...) frame, an image of a low frequency component in the image of the i-th frame as a low frequency component image i;
a unit that generates, from the image of the i-th frame, a high frequency component-emphasized image i which emphasizes a high frequency component in the image of the i-th frame;

a unit that performs lossy compression processing for the low frequency component image i to generate a compressed image i and store the generated compressed image i in a memory;

a unit that decodes a compressed image (i−1) stored in the memory to generate a decoded image (i−1);

a unit that decodes the compressed image i to generate a decoded image i;

a unit that generates a difference image between the decoded image i and the low frequency component image i;

a unit that generates an image E1 having a pixel value obtained by multiplying a pixel value of each pixel forming the difference image by r (0<r<1), and an image E2 having a pixel value obtained by multiplying a pixel value of each pixel forming the difference image by (1−r);

a unit that composites the low frequency component image i, the decoded image (i−1), and the image E1 at a predetermined ratio to generate a composite image; and a unit that outputs an image obtained by compositing the high frequency component-emphasized image i and the image E2, and the composite image as subframe images of the i-th frame.

5. An image processing method to be performed by an image processing apparatus, comprising:

a step of generating, from an input image of an i-th (i=1, 2, ...) frame, an image of a low frequency component in the image of the i-th frame as a low frequency component image i;

a step of generating, from the image of the i-th frame, a high frequency component-emphasized image i which emphasizes a high frequency component in the image of the i-th frame;

a step of performing lossy compression processing for the low frequency component image i to generate a compressed image i and store the generated compressed image i in a memory;

a step of decoding a compressed image (i−1) stored in the memory to generate a decoded image (i−1);

a step of decoding the compressed image i to generate a decoded image i;

a step of generating a difference image between the decoded image i and the low frequency component image i;

a generation step of compositing the low frequency component image i, the decoded image (i−1), and the difference image at a predetermined ratio to generate a composite image; and an output step of outputting the high frequency component-emphasized image i and the composite image as subframe images of the i-th frame.

6. An image processing method to be performed by an image processing apparatus, comprising the steps of:

generating, from an input image of an i-th (i=1, 2, ...) frame, an image of a low frequency component in the image of the i-th frame as a low frequency component image i;

generating, from the image of the i-th frame, a high frequency component-emphasized image i which emphasizes a high frequency component in the image of the i-th frame;

performing lossy compression processing for the low frequency component image i to generate a compressed image i and store the generated compressed image i in a memory;

decoding a compressed image (i−1) stored in the memory to generate a decoded image (i−1);

decoding the compressed image i to generate a decoded image i;

generating a difference image between the decoded image i and the low frequency component image i;

generating an image E1 having a pixel value obtained by multiplying a pixel value of each pixel forming the difference image by r (0<r<1), and an image E2 having a pixel value obtained by multiplying a pixel value of each pixel forming the difference image by (1−r);

compositing the low frequency component image i, the decoded image (i−1), and the image E1 at a predetermined ratio to generate a composite image; and outputting an image obtained by compositing the high frequency component-emphasized image i and the image E2, and the composite image as subframe images of the i-th frame.

7. A non-transitory computer-readable storage medium storing a computer program for causing a computer to function as each unit of an image processing apparatus defined in claim 1.

* * * * *